United States Patent
Khait et al.

(10) Patent No.: US 12,063,278 B2
(45) Date of Patent: *Aug. 13, 2024

(54) LEVERAGING WEB COOKIES FOR CARRYING MESSAGES ACROSS CLOUD APPLICATION COMMUNICATIONS

(71) Applicant: Microsoft Technology Licensing, LLC, Redmond, WA (US)

(72) Inventors: Vitaly Khait, Yavne (IL); Nir M. Rappaport, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,757

(22) Filed: Mar. 10, 2023

(65) Prior Publication Data

US 2023/0216925 A1 Jul. 6, 2023

Related U.S. Application Data

(63) Continuation of application No. 16/165,730, filed on Oct. 19, 2018, now Pat. No. 11,616,847.

(51) Int. Cl.
| | |
|---|---|
| *H04L 67/142* | (2022.01) |
| *H04L 67/02* | (2022.01) |
| *H04L 67/56* | (2022.01) |
| *H04L 67/01* | (2022.01) |
| *H04L 67/10* | (2022.01) |

(52) U.S. Cl.
CPC ............ *H04L 67/142* (2013.01); *H04L 67/02* (2013.01); *H04L 67/56* (2022.05); *H04L 67/01* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 7,370,071 B2* | 5/2008 | Greschler | ........... G06F 9/44526 709/201 |
| 2002/0078203 A1* | 6/2002 | Greschler | ............... H04L 67/10 709/225 |
| 2003/0065950 A1* | 4/2003 | Yarborough | ........ H04L 63/0281 726/4 |

(Continued)

*Primary Examiner* — Quang N Nguyen
(74) *Attorney, Agent, or Firm* — Weaver IP L.L.C.

(57) ABSTRACT

Embodiments described herein leverage web cookies to carry messages across cloud application communications, wherein the messages are between entities that are not part of the cloud application itself. For example, in embodiments, a proxy server is interconnected between a client computer that is executing a front-end component of an application and an application server that is executing a back-end component of the application. The proxy server intercepts a request from the front-end component that is intended for the back-end component and generates a response thereto that includes a command to create a web cookie at the client computer, wherein the web cookie includes data to be utilized by a custom code component of the client computer. The proxy server may further cause the custom code component to be injected into the application front-end component for execution by the client computer.

20 Claims, 6 Drawing Sheets

(56) References Cited

U.S. PATENT DOCUMENTS

| | | | |
|---|---|---|---|
| 2016/0036786 A1* | 2/2016 | Gandhi | H04W 12/06 |
| | | | 713/168 |
| 2022/0391270 A1* | 12/2022 | Gnanasambandam | ....................... |
| | | | G16H 20/70 |
| 2023/0057091 A1* | 2/2023 | Khan | G06N 3/02 |
| 2023/0205503 A1* | 6/2023 | Lin | G06F 9/44521 |
| | | | 717/169 |

* cited by examiner

LEVERAGING WEB COOKIES FOR CARRYING MESSAGES ACROSS CLOUD APPLICATION COMMUNICATIONS

CROSS-REFERENCE TO RELATED APPLICATION

This application is a continuation of U.S. patent application Ser. No. 16/165,730, entitled "LEVERAGING WEB COOKIES FOR CARRYING MESSAGES ACROSS CLOUD APPLICATION COMMUNICATIONS," which was filed on Oct. 19, 2018, now U.S. Pat. No. 11,616,847, issued on Mar. 28, 2023, and is herein incorporated by reference in its entirety.

BACKGROUND

The digital arena for nearly all organizations is fueled by enterprise-grade cloud and mobile technology, making the security of that arena a paramount, yet tricky undertaking. These organizations are faced with the unique balancing act of protecting their digital assets while fostering user productivity. To achieve this 'computing equilibrium', companies must have an immediate and clear understanding of who is accessing organizational resources, how those resources are being interacted with, and what user actions are being performed in their cloud computing environments.

This threefold endeavor serves as the cornerstone of user access management and impacts user activity across all environments, from public and private clouds to virtual networks and on-premise servers. Due to this far reaching impact, one approach to user access management for an organization may be to implement automated session control protocols that can limit or restrict what exactly a user can access across web or mobile applications and other enterprise systems depending on various login factors.

From a more granular perspective, this approach can be achieved through a cloud access security broker (CASB), which is a proxy that sits between cloud applications and users of cloud applications, monitoring interactions between the two sides and enforcing security policies during these interactions. For example, a CASB may be able to intercept a user request and, based on a series of access control protocols, determine what the user can access and interact with in regards to the client's resources. In tandem, a CASB can collect important information about the user traffic within the client's computing ecosystem, which provides valuable insights for detecting, diagnosing, and remedying possible security breaches.

This real-time reporting of user traffic, along with robust access control protocols, gives organizations unparalleled visibility and control. For example, a company may grant access to a set of users to upload customer account information to a particular document management system within the organization's virtual network. Additionally, the company may posit, as a customer privacy measure, that no social security information is to be included within that uploaded data. At the same time, the company may want another group of users to be permitted to view this customer information but not be permitted to download any of this specific content to their devices. Conjointly, the company may desire reporting functionality that can detect odd access patterns for the two user groups described above.

However, these cutting-edge capabilities may call for a very elaborate technical architecture that can be cumbersome, invasive, and equivocal for organizations and their users alike. Say, based upon the example earlier described, that a CASB does, in fact, block user activity because social security numbers were detected within the uploaded customer account information. A conventional proxying environment may fail to communicate the reasons to the users for the blockage, possibly leaving users oblivious to the blockage and the reasons thereof, especially during technical 'incursions' like traffic blocks. Alternatively, a conventional proxying environment could use a complex multi-channel communication scheme that may adversely impact the resources and efficiency of a computing ecosystem.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to leveraging web cookies to carry messages across cloud application communications, wherein the messages are between entities that are not part of the cloud application itself. For example, in embodiments described herein, a proxy server is interconnected between a client computer that is executing a front-end component of an application and an application server that is executing a back-end component of the application. The proxy server intercepts a request from the front-end component that is intended for the back-end component and generates a response thereto that includes a command to create a web cookie at the client computer, wherein the web cookie includes data to be utilized by a custom code component of the client computer. The proxy server may further cause the custom code component to be injected into the front-end component of the application for execution by the client computer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Leveraging Web Cookies for Carrying Messages Across Cloud Application Communications The digital arena for nearly all organizations is fueled by enterprise-grade cloud and mobile technology, making the security of that arena a paramount, yet tricky undertaking. These organizations are faced with the unique balancing act of protecting their digital assets while fostering user productivity. To achieve this 'computing equilibrium', companies must have an immediate and clear understanding of who is accessing organizational resources, how those resources are being interacted with, and what user actions are being performed in their cloud computing environments.

This threefold endeavor serves as the cornerstone of user access management and impacts user activity across all environments, from public and private clouds to virtual networks and on-premise servers. Due to this far reaching impact, one approach to user access management for an organization may be to implement automated session control protocols that can limit or restrict what exactly a user can access across web or mobile applications and other enterprise systems.

From a more granular perspective, this approach can be achieved through a cloud access security broker (CASB), which is a proxy that sits between cloud applications and users of cloud applications, monitoring interactions between the two sides and enforcing security policies during these interactions. For example, a CASB may be able to intercept a user request and, based on a series of access control protocols, determine what the user can access and interact with in regards to the client's resources. In tandem, a CASB can collect important information about the user traffic within the client's computing ecosystem, which provides valuable insights for detecting, diagnosing, and remedying possible security breaches.

This real-time reporting of user traffic, along with robust access control protocols, gives organizations unparalleled visibility and control. For example, a company may grant access to a set of users to upload customer account information to a particular document management system within the organization's virtual network. Additionally, the company may posit, as a customer privacy measure, that no social security information is to be included within that uploaded data. At the same time, the company may want another group of users to be permitted to view this customer information but not be permitted to download any of this specific content to their devices. Conjointly, the company may desire reporting functionality that can detect odd access patterns for the two user groups described above.

However, these cutting-edge capabilities may call for a very elaborate technical architecture that can be cumbersome, invasive, and equivocal for organizations and their users alike. Say, based upon the example earlier described, that a CASB does, in fact, block user activity because social security numbers were detected within the uploadable customer account information. A conventional proxying environment may fail to communicate the reasons to the users for the blockage, possibility leaving users oblivious to the blockage and the reasons thereof, especially during technical 'incursions' like traffic blocks. Alternatively, a conventional proxying environment could use a complex multi-channel communication scheme that may adversely impact the resources and efficiency of a computing ecosystem.

An improved proxying environment is needed that may be sophisticated but still agile, robust yet efficient, and both highly customizable and highly available. Embodiments described herein bestow improvements to this unique technology that optimize visibility and control without reducing productivity or risking application failure. Embodiments described herein provide for a nimble communication process by injecting or modifying Hypertext Transfer Protocol (HTTP) headers of regular application responses for messaging across cloud application communications with minimal intervention in client-side/cloud-based application communication traffic and with minimal impact on the client-side application. For example, an HTTP header may be modified to include a "set cookie" command that cause a web cookie to be created on the client that includes desired messaging or other information that can then be accessed by custom code running at the client. In other embodiments, a service worker may be employed at the client to obtain relevant values from a custom HTTP header.

Figure 1:
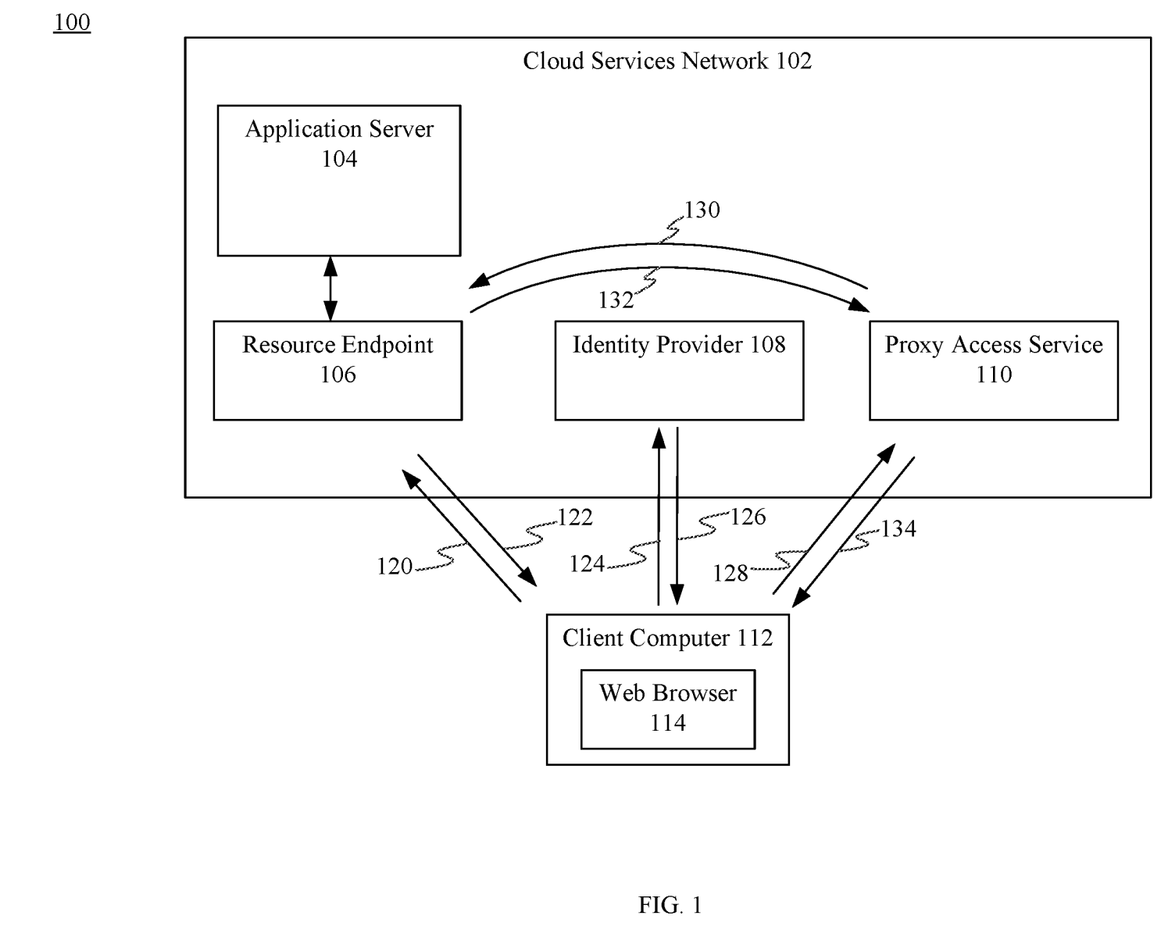
FIG. 1 is a block diagram of an example system that enables redirection of requests for a cloud application from the cloud application to a proxy access service, in accordance with an embodiment.

To help illustrate this, FIG. 1 will now be described. In particular, FIG. 1 is a block diagram of an example system 100 that enables redirection of requests for a cloud application from the cloud application to a proxy access service while a user's proxy session is active. As shown in FIG. 1, system 100 includes a cloud services network 102 and a client computer 112. As further shown in FIG. 1, cloud services network 102 includes an application server 104, a resource endpoint 106, an identity provider 108, and a proxy access service 110, and client computer 112 includes a web browser 114.

In FIG. 1, cloud services network 102 hosts an application in which resources associated with the application are stored on application server 104. The application may be of any type of web accessible application/service, such as a database application, a social networking application, a messaging application, a financial services application, a news application, a search application, a web-accessible productivity application, a cloud storage and/file hosting application, or the like. Although cloud services network 102 of FIG. 1 is shown to host one application, it is to be understood that the techniques described herein may apply to cloud services networks that host more than one application. Application server 104 may include one or more server devices and/or other computing devices.

Resource endpoint 106 may serve as a login endpoint for a resource of a cloud application and indicate where the resource can be accessed by a client device on application server 104. Identity provider 108 may create, maintain, and manage identity information associated with users while providing authentication services to relying cloud applications and/or services, and proxy access service 110 may monitor and manage interactions between cloud applications and users of these cloud applications. Web browser 114 executing on client computer 112 may enable interactions between a user of client computer 112 and cloud applications.

Each component of cloud services network 102 and client computer 112 may be communicatively connected via one or more networks (not pictured in FIG. 1). These one or more networks may include, for example, a local area network (LAN), a wide area network (WAN), a personal area network (PAN), and/or a combination of communication networks, such as the Internet.

Client computer 112 may be any type of stationary or mobile computing device, including a mobile computer or mobile computing device (e.g., a smart phone, a laptop computer, a notebook computer, a tablet computer such as an Apple iPad™, a netbook, etc.), a wearable computing device (e.g., a smart watch, a head-mounted device including smart glasses such as Google® Glass™, etc.), or a stationary computing device such as a desktop computer or PC (personal computer).

As depicted in FIG. 1, resource endpoint 106 (associated with a resource of the application hosted in cloud services network 102) may receive a request 120 from client computer 112 originating in web browser 114 (e.g., by issuing a Uniform Resource Locator (URL) of the application in web browser 114). For the sake of illustration, assume request 120 is a request for access to the resource (e.g., web pages, e-mail, information from databases, or web services) of the application on behalf of a user of client computer 112.

In response to receiving request 120, resource endpoint 106 may determine that the user has not yet been authenticated and may therefore provide a response 122 to web browser 114 that causes browser 114 to send a request 124 to identity provider 108 for user authentication. For instance, resource endpoint 106 may redirect web browser 114 to identity provider 108 in response to determining that a token, which enables resource endpoint 106 to determine whether the user should be granted access to the resource, was not provided with request 120.

After receiving request 124, identity provider 108 may determine based on an access policy whether web browser 114 should access the resource via proxy access service 110. An access policy may outline which users or groups of users' and what applications' network cloud traffic should be routed to proxy access service 110 for monitoring and/or managing. In embodiments, an information technology (IT) administrator for an organization may set access policies for applications and users of client devices that access a computer network of the organization (e.g., contract employees of the organization). For example, identity provider 108 may evaluate a user's login (e.g., username and password) to determine if there is a policy associated with that user and establish that a particular user is a contract employee based on the contract employee's username including an indicator of her employment status.

Identity provider 108 may further authenticate the user associated with request 124 and create a token that can be used to determine whether the user should be granted access to the resource. In some embodiments, during authentication, a user may be prompted by identity provider 108 to provide his or her user login credentials. After determining that web browser 114 should access the resource via proxy access service 110, identity provider 108 may send a response 126 to web browser 114 that includes an encrypted version of the token and that redirects web browser 114 to send a request 128 to proxy access service 110 that includes such encrypted token.

After receiving redirected request 128, proxy access service 110 may decrypt the token and then generate a corresponding request 130 that includes the decrypted token and provide it to resource endpoint 106. Resource endpoint 106 may grant or deny access to the resource located on application server 104 based on the token. If access is granted, application server 104 may interpret request 130, generate a response 132 to request 130, and issue response 132 to proxy access service 110. In some embodiments, response 132 may include a file stored on application server 104 or an output from executing a program kept on application server 104. In other embodiments, response 132 may include an error message if the request could not be fulfilled.

After receiving response 132, proxy access service 110 may generate a response 134 and send it to web browser 114.

In response to receiving response 134, web browser 114 may interpret response 134 and display contents of response 134 on a window of web browser 114 for the user of client computer 112. Response 134 may be the same as response 132 or augmented by proxy access service 110 based on control policies (discussed in greater detail in reference to FIG. 4).

Any further requests related to accessing the resource of application server 104a and originating in web browser 114 during the user's proxy session may be directed to proxy access service 110, and any responses generated by proxy access service 110 to the further requests may be issued to web browser 114 by proxy access service 110 on behalf of resource endpoint 106. A suffix proxy may be implemented in system. 100 to keep the user within the session. Suffix proxies permit the user to access resources by including the name of a proxy server to the requested resource URL. For example, relevant. URLs for the application hosted in cloud services network 102 may be replaced with unique URLs. To illustrate, if a webpage is a requested resource of a target application which has a domain of targetapplication.com, the link to the webpage may appear as: targetapplication.com.proxyserver.

Figure 2:
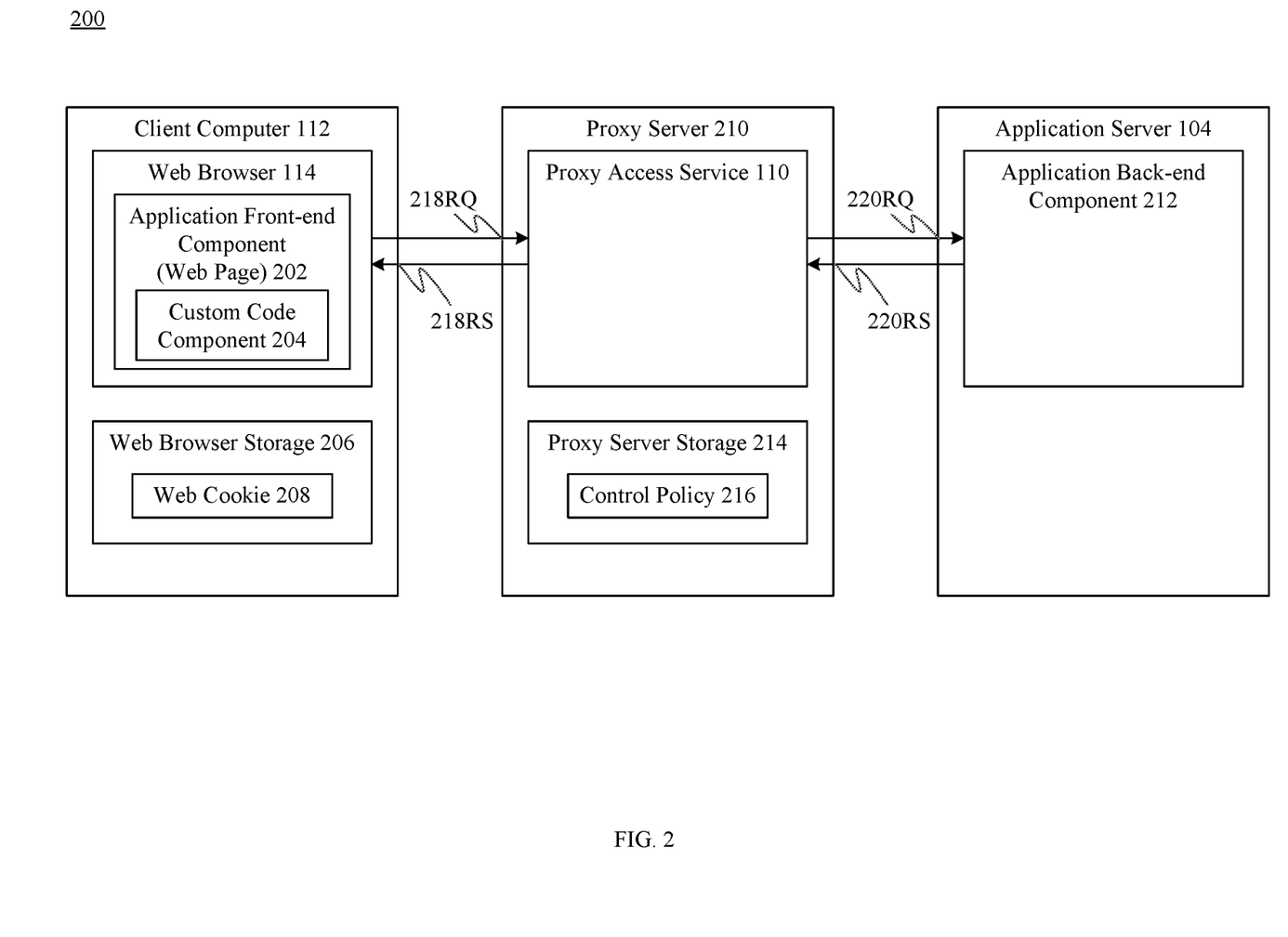
FIG. 2 is a block diagram of an example system that enables generating, at a proxy server interconnected between a client computer and an application server, a response to an intercepted request that includes a command to create a web cookie at the client computer and where the web cookie includes data intended for utilization at the client computer, in accordance with an embodiment.

To help further illustrate, FIG. 2 will now be described. In particular, FIG. 2 is a block diagram of an example system 200 that enables generating, at a proxy server interconnected between a client computer and an application server, a response to an intercepted request that includes a command to create a web cookie at the client computer and where the web cookie includes data intended for utilization at the client computer. As shown in FIG. 2, system 200 includes: a proxy server 210, client computer 112, and application server 104, the last two being described in FIG. 1. As further shown in FIG. 2, proxy server 210 includes proxy access service 110, as described in FIG. 1, and a proxy server storage 214, which stores a control policy 216. Additionally depicted in FIG. 2, client computer 112 includes: 1) web browser 114 (as described in FIG. 1 and further comprising an application front-end component 202 and a custom code component 204) and 2) a web storage browser 206, which stores a web cookie 208. Lastly, shown in FIG. 2, application server 104 includes an application back-end component 212.

Proxy server 210 may be communicatively interconnected between client computer 112 and application server 104 via one or more networks (not pictured in FIG. 2). These one or more networks may include, for example, a local area network (LAN), a wide area network (WAN), a personal area network (PAN), and/or a combination of communication networks, such as the Internet. Proxy server 210 may establish itself as an intermediary for client computer 112 and application server 104 using the process described in FIG. 1 for establishing a redirection of requests made by a client computer for an application to a proxy server. Proxy server 210 may also comprise one or more server devices and/or other computing devices.

Application front-end component 202 and application back-end component 212 are example components of the cloud application hosted in cloud services network 102 described in FIG. 1. As shown in FIG. 2, application front-end component 202 may be represented as a web page displayed in web browser 114. In other embodiments, application front-end component 202 may also be an Internet-enabled application executing on client computer 112. Still other implementations of application front-end component 202 are possible.

Proxy access service 110 running on proxy server 210 may be configured to intercept a request from application front-end component 202 that is intended for application back-end component 212. Proxy access service 110 may be further configured to generate a response to the intercepted request that includes a command to create a web cookie at a client computer 112. The web cookie may include data intended for utilization at client computer 112. For example, in response to receiving and after interpreting a request 218RQ from application front-end component 202, proxy access service 110 may generate a response 218RS that includes a command to create a web cookie, and return response 218RS to web browser 114. In response to receiving 218RS, web browser 114 may execute the command, create web cookie 208 and store web cookie 208 in web browser storage 206. The data included in web cookie 208 could be utilized by components of client computer 112 in several ways. As one example, the data may include a notification for displaying in a window of web browser 114 for the user of client computer 112. As another example, the data may include code for closing web browser 114 to terminate a session between a user and an application.

In an embodiment, where request 218RQ comprises a HTTP request, proxy access service 110 may return response 218RS to web browser 114 that comprises an HTTP response in response to receiving request 218RQ. In addition, in this embodiment, proxy access service 110 may provide the command to create a web cookie at client computer 112 by including in response 218RS a Set-Cookie HTTP response header. This header from a server instructs a client computer to store a cookie at the client computer.

Typically, a web cookie is data connected to a client-side context that is useful to a server. For example, web cookies are mainly used for session management (e.g., logins, shopping carts, game scores, etc.), personalization (e.g., user preferences, themes, other settings), and tracking of user behavior. Also, a web cookie is usually stored by a web browser and returned to a server in requests, where the data of the web cookie is utilized at the server. In contrast, web cookie 208 includes data to be utilized by components of the client computer.

It is noted that, in accordance with other embodiments, proxy access service 110 may inject or modify an HTTP header of 218RS in some other manner than that described above ("Set-Cookie") to cause messaging or other desired information to be carried to client computer 112 where it can be obtained by custom code executing thereon. For example, in accordance with one non-limiting alternate embodiment, a service worker may be employed at client computer 112 to obtain relevant values from a custom HTTP header.

Figure 3:
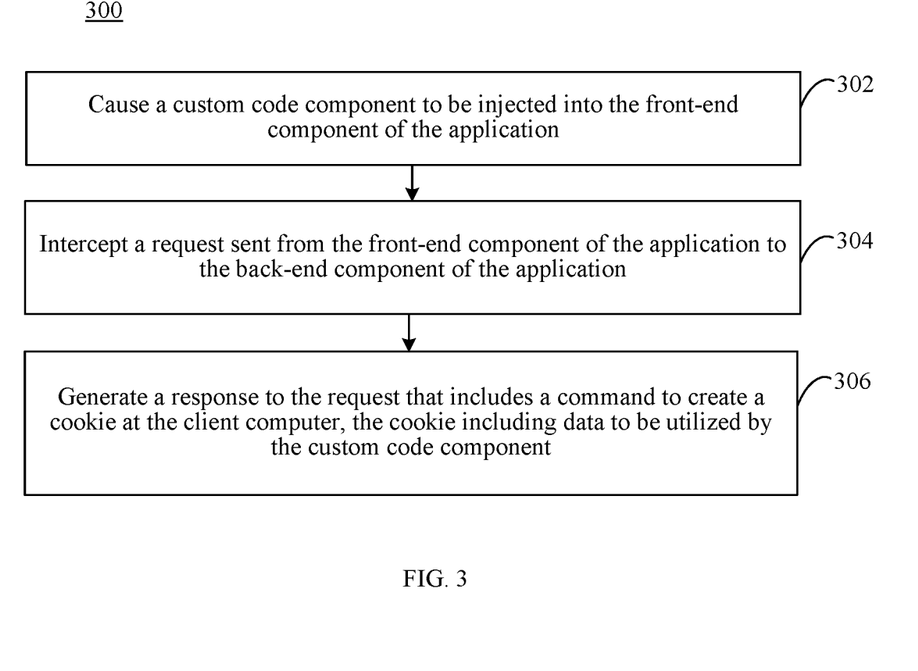
FIG. 3 depicts a flowchart of a method for generating, at a proxy server interconnected between a client computer and an application server, a response to an intercepted request that includes a command to create a web cookie at the client computer and where the web cookie includes data to be utilized by a custom code component of the client computer, in accordance with an embodiment.

To explore this further, FIG. 3 is described. FIG. 3 depicts a flowchart 300 of a method for generating, at a proxy server interconnected between a client computer and an application server, a response to an intercepted request that includes a command to create a web cookie at the client computer, wherein the web cookie includes data to be utilized by a custom code component of the client computer, according to an example embodiment. FIG. 3 will be described with continued reference to FIG. 2. However, other structural and operational embodiments will be apparent to persons skilled in the relevant art(s) based on the following discussion regarding flowchart 300.

As shown in FIG. 3, the method of flowchart 300 begins at step 302. In step 302, a custom code component is caused to be injected into the front-end component of the application. For example, and with continued reference to FIG. 2, proxy access service 110 may cause custom code component 204 to be injected into application front-end component 202 by including custom code component 204 in response 218RS. To help illustrate, assume web browser 114 issues request 218RQ for a web page of application front-end component 202. Proxy access service 110 may then issue request 220RQ to obtain the web page from application server 104. After receiving the web page via response 220RS, proxy access service 110 may append code (e.g., JavaScript) to the web page and provide it web browser 114 via response 218RS. After response 218RS is received and interpreted by web browser 114, the web page of application front-end component 202 containing the code is displayed and custom code component 204 is executing in web browser 114. When executing, custom code component 204 may periodically check web browser storage 206 to determine if a new cookie has been received and when a new cookie is detected, utilize the data that is included in the new cookie. In some embodiments, proxy access service 110 is configured to append code to the web page in response to determining that a main web page of the application is being loaded. By providing the code to web browser 114 by "piggybacking off" of an already-occurring request/response for a resource, proxy server 210 will not have to find another communication channel for transferring code and can transfer it in a manner with minimal intrusion on network cloud traffic and the system itself.

At step 304 in flowchart 300, a request, sent from the front-end component of the application to the back-end component of the application, is intercepted. For example, referencing FIG. 2, proxy access service 110 intercepts request 218RQ sent from application front-end component 202 to application back-end component 212. For this interception to occur, an identity provider, relied upon by the application for identity provider services, may have determined based on an access policy that request 218RQ should be redirected to proxy access service 110. For example, the identity provider may identity an access policy associated with a user of client computer 112 and/or the application. As such, any requests sent from application front-end component 202 to application back-end component 212 will be redirected to proxy access service 110 during the user's active proxy session.

At step 306 in flowchart 300, a response to the request is generated that includes a command to create a cookie at the client computer, where the cookie includes data to be utilized by the custom code component. For example, and with continued reference to FIG. 2, in response to receiving and interpreting request 218RQ, proxy access service 110 may generate a response 218RS including a command to create a web cookie at client device 112 and return response 218RS to web browser 114. In response to receiving response 218RS, web browser 114 may execute the command, thereby creating web cookie 208 and storing web cookie 208 in web browser storage 206.

The data included in web cookie 208 may be utilized by custom code component 204 of client computer 112 in various manners based on the type of data included in web cookie 208. In one example, the data included in web cookie 208 may comprise a message concerning an action that was blocked by proxy access service 110 (e.g., downloading a resource with customer credit card numbers) and custom code component 204 may utilize such data to superimpose a warning message across the display of the web page associated with the application requesting the download. Furthermore, the data included in web cookie 208 and consumed by custom code component 204 may comprise one or more of: information to be displayed by custom code component 204 (e.g., such as a messages, notifications, and/or warnings to be displayed in a window of a web browser); actions to be performed by custom code component 204 (e.g., increasing a frequency at which to check for new web cookies, downloading additional web content from a different location, etc.); instructions to be executed by the custom code component (e.g., actual code to be executed by custom code component 204).

Figure 4:
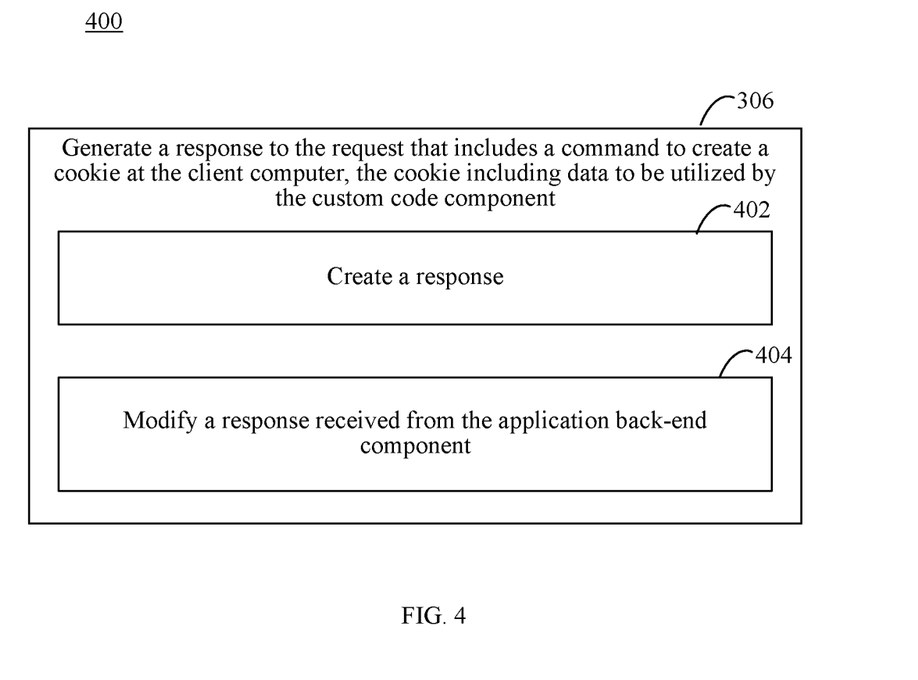
FIG. 4 depicts a flowchart of various methods of generating a response to a request that includes a command to create a cookie at a client computer, where the cookie includes data to be utilized by a custom code component, in accordance with an example embodiment.

This feature of system 200 will now be further described in reference to FIG. 4. However, other structural and operational embodiments will be apparent to persons skilled in the relevant art(s) based on the following discussion regarding flowchart 400.

FIG. 4 depicts a flowchart 400 of various methods of performing step 306 of flowchart 300 of FIG. 3. At step 306 in flowchart 300, a response to the request is generated that includes a command to create a cookie at the client computer, where the cookie includes data to be utilized by the custom code component.

At step 402 in flowchart 400, a response is created. For example, and with continued reference to FIG. 2, proxy access service 110 may generate a response 218RS in response to receiving and interpreting request 218RQ and return it to application front-end component 202. Based on its interpretation, proxy access service 110 may determine that request 218RQ comprised an action that should be blocked and may generate response 218RS itself based on this determination. For example, say request 218RQ comprised an action of uploading of sensitive material to application back-end component 212, proxy access service 110 may prevent the upload by not even forwarding the request to application back-end component 212 and generating response 218RS itself and returning it to application front-end component 202, wherein response 218RS includes a command to create a web cookie that includes a notification indicating as to why the user's action was blocked such as: "The sharing of security-sensitive company material externally is strictly prohibited." A security administrator for an organization may develop the content of a notification associated with a blocked action.

At step 404 in flowchart 400, a response received from the application back-end component is modified. For example, and with continued reference to FIG. 2, proxy access service 110 may modify response 220RS received from application back-end component 212 before sending the response to application front-end component 202. To help illustrate, say application back-end component 202 issues request 218RQ concerning a resource download and proxy access service 110 determines that the resource download should be blocked. Instead of blocking the action here by not forwarding it to application back-end component 212, proxy access service 110 may issue corresponding request 220RQ, requesting application back-end component 212 to fulfill the request. After receiving response 220RS to request 220RQ, proxy access service 110 may modify response 220RS by replacing the resource meant for download with a "fake" file. Proxy access service 110 may then generate response 218RS, including the fake file and a command to generate a web cookie that includes a message indicating why the download was blocked. This gives proxy access service 110 the flexibility in not having to understand the response and prevents disturbing the front-end component of the application.

Proxy access service 110 may further block an action or generate/modify a response based on control policy 216 stored in proxy server storage 214. A control policy may define which characteristics of network cloud traffic should be managed and what actions need to be taken in managing the network cloud traffic. Some examples of the characteristics include: device identification such as identifying that a request is issued by an unmanaged client device; location information of cloud applications seeking to be accessed; confidentiality classifications of resources associated with a request; and sensitivity levels of content of resources associated with a request. Additionally, some examples of actions need to be taken in managing the network cloud traffic include: allowing unrestricted access to a cloud application but monitoring the interaction between users and the cloud application; blocking the download of a resource; and providing further protection to a resource by encrypting content of a resource being uploaded to a cloud application. A security administration of an organization may set these control policies.

Figure 5:
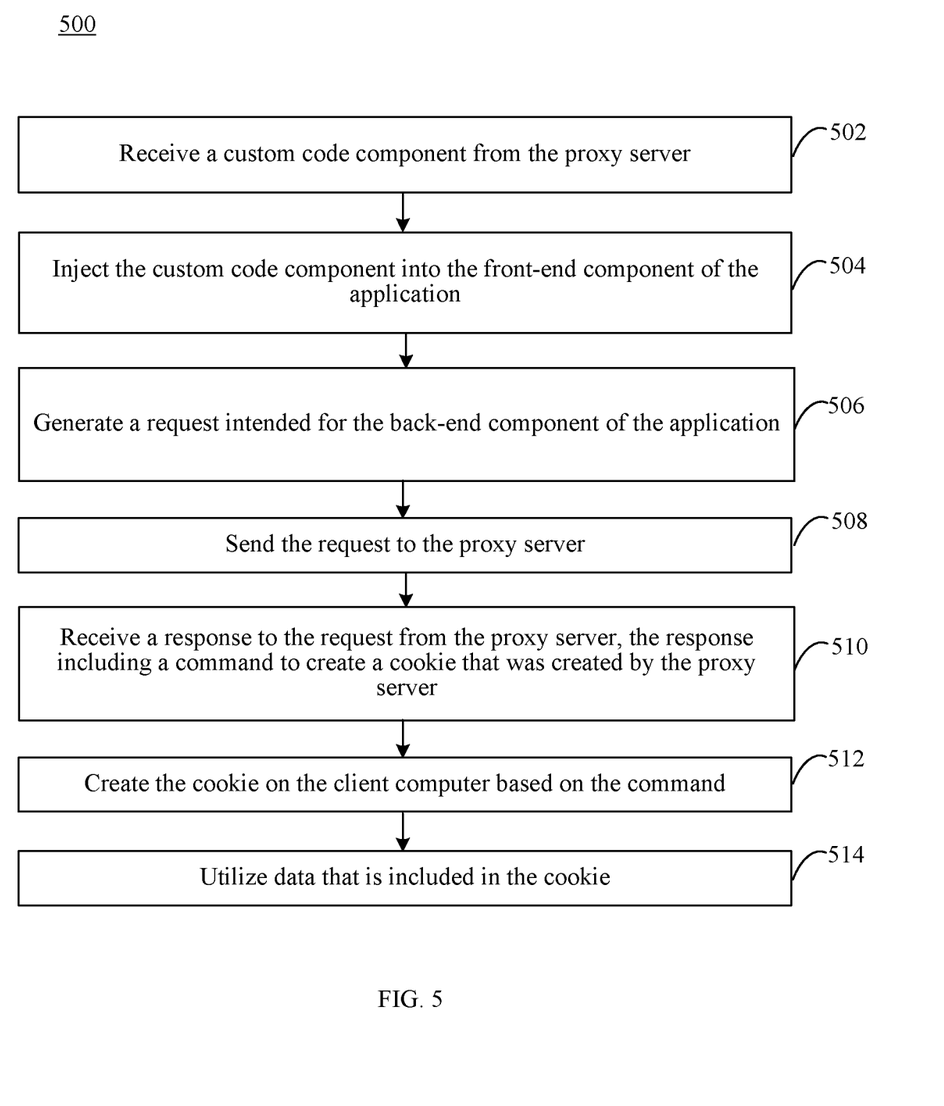
FIG. 5 depicts a flowchart a method performed at a client computer for injecting a custom code component into a front-end component of an application, creating a web cookie on the client computer, and utilizing the data included in the web cookie at the client computer, in accordance with an embodiment.

System 200 will now be further described in reference to FIG. 5. However, other structural and operational embodiments will be apparent to persons skilled in the relevant art(s) based on the following discussion regarding flowchart 500.

FIG. 5 depicts a flowchart 500 a method performed at a client computer for injecting custom code component into a front-end component of an application, creating a web cookie on the client computer, and utilizing the data included in the web cookie at the client computer. As shown in FIG. 5, the method of flowchart 500 begins at step 502. In step 502, a custom code component is received from the proxy server. For example, and with continued reference to FIG. 2, application front-end component 202 receives a custom code component from proxy access service 110 via response 218RS after issuing request 218RQ to proxy access service 110. As described previously, proxy access service 110 may append code to the web site and provide it to application front-end component 202 via response 218RS. In some embodiments, the code may be injected as part of the regular loading of a main web page of an application.

At step 504 in flowchart 500, the custom code component is injected into the front-end component of the application. For example, and with continued reference to FIG. 2, after response 218RS is received and interpreted by web browser 114, custom code component 204 included in response 218RS is appended to the web page of application front-end component 202 so that it is executed by web browser 114. As was previously discussed, such custom code component 204 may be configured to periodically check to determine if a new web cookie has been stored (e.g., web cookie 208).

At step 506 in flowchart 500, a request intended for the back-end component of the application is generated. For example, and with continued reference to FIG. 2, application front-end component 202 generates request 218RQ intended for application back-end component 212.

At step 508 in flowchart 500, the request is sent to the proxy server. For example, and with continued reference to FIG. 2, application front-end component 202 sends the request to the proxy server 210. As described above, proxy access service 110 intercepts request 218RQ sent from application front-end component 202 to application back-end component 212.

At step 510 in flowchart 500, a response to the request is received from the proxy server, where the response includes a command to create a cookie that was created by the proxy server. For example, and with continued reference to FIG. 2, application front-end component 202 receives response 218RS to the request 218RQ from proxy server 210, where the response 218RS includes a command to create a cookie that was created by proxy server 210.

At step 512 in flowchart 500, the cookie is created on the client computer based on the command. For example, and with continued reference to FIG. 2, in response to receiving 218RS, web browser 114 creates the cookie on client computer 112 based on the command. To illustrate, web browser 114 may execute the command and create web cookie 208 and store web cookie 208 in web browser storage 206.

At step 514 in flowchart 500, data that is included in the cookie is utilized. For example, and with continued reference to FIG. 2, custom code component 204 utilizes data that is included in web cookie 208. Custom code component 204 may detect that web cookie 208 has been newly stored in web browser storage 206. Custom code component 204 may retrieve the data and perform the actions indicated by the data. If the blocked action is an upload of a resource including sensitive business information, the data contained in web cookie 208 may include information to be displayed in web browser 114, alerting that the upload has been blocked and specifying the reason for it being blocked.

Figure 6:
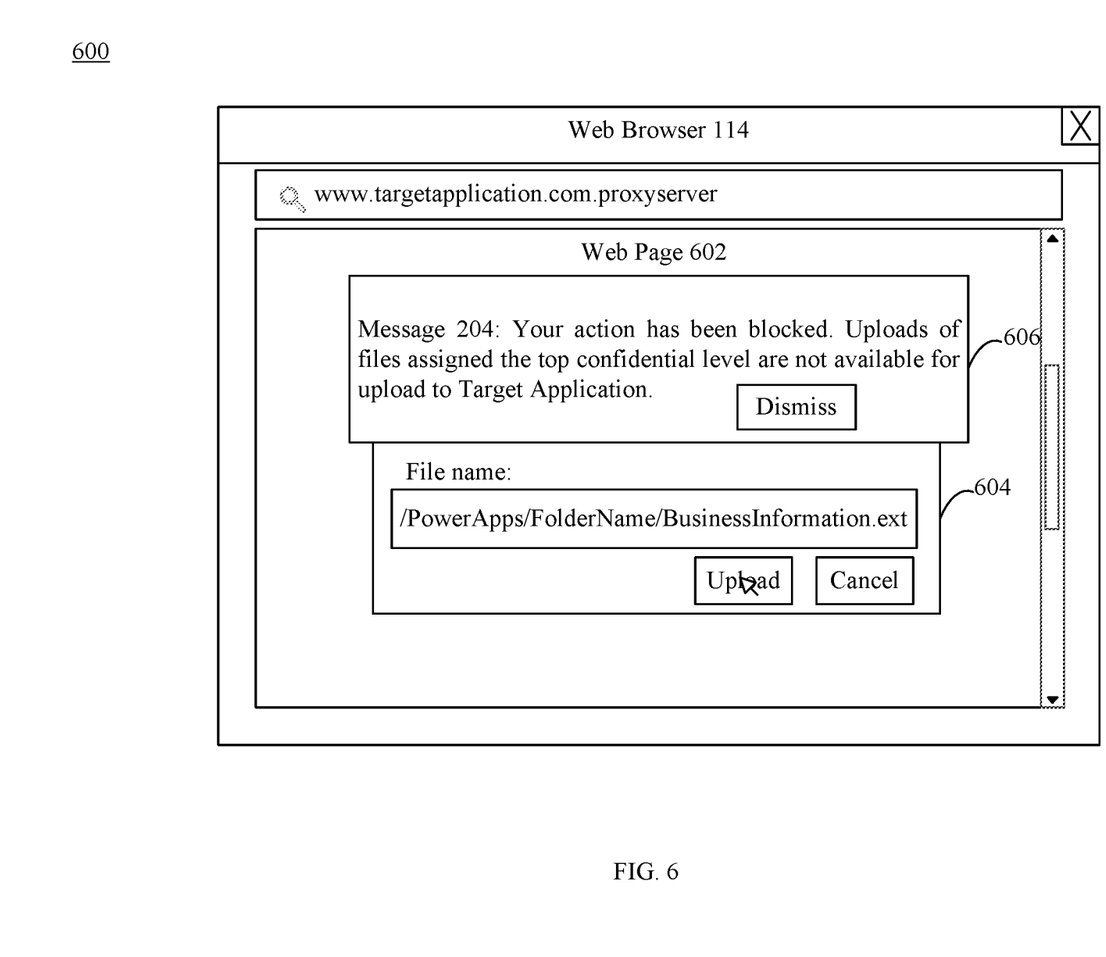
FIG. 6 depicts an example display of a web browser including a web page of a target application, in accordance with an embodiment.

To help illustrate, this example will now be described in reference to FIG. 6 and continued reference to FIG. 2. FIG. 6 depicts an example display 600 of web browser 114 including a web page 602 of a target application (as indicated by the URL in www.targetappliation.com.proxyserver), in accordance with embodiments described herein. As depicted in FIG. 6, a user has selected to upload a file, named BusinessInformation, to www.targetapplication.com by selecting the upload button in a prompt 602. Because the file includes sensitive business information, custom code component 204 overlays across the display of web page 602 a notification 606, stating: "Your action has been blocked. Uploads of files assigned the top confidential level are not available for upload to Target Application."

After a user has read notification 606, the user may click the dismiss button in notification 606. Clicking the dismiss button triggers web browser 114 to send a request to dismiss notification 606 to proxy access service 110. After receiving the request, proxy access service 110 returns a response prompting web browser 114 to set web cookie 208 to expired.

III. Example Computer System Implementation

Figure 7:
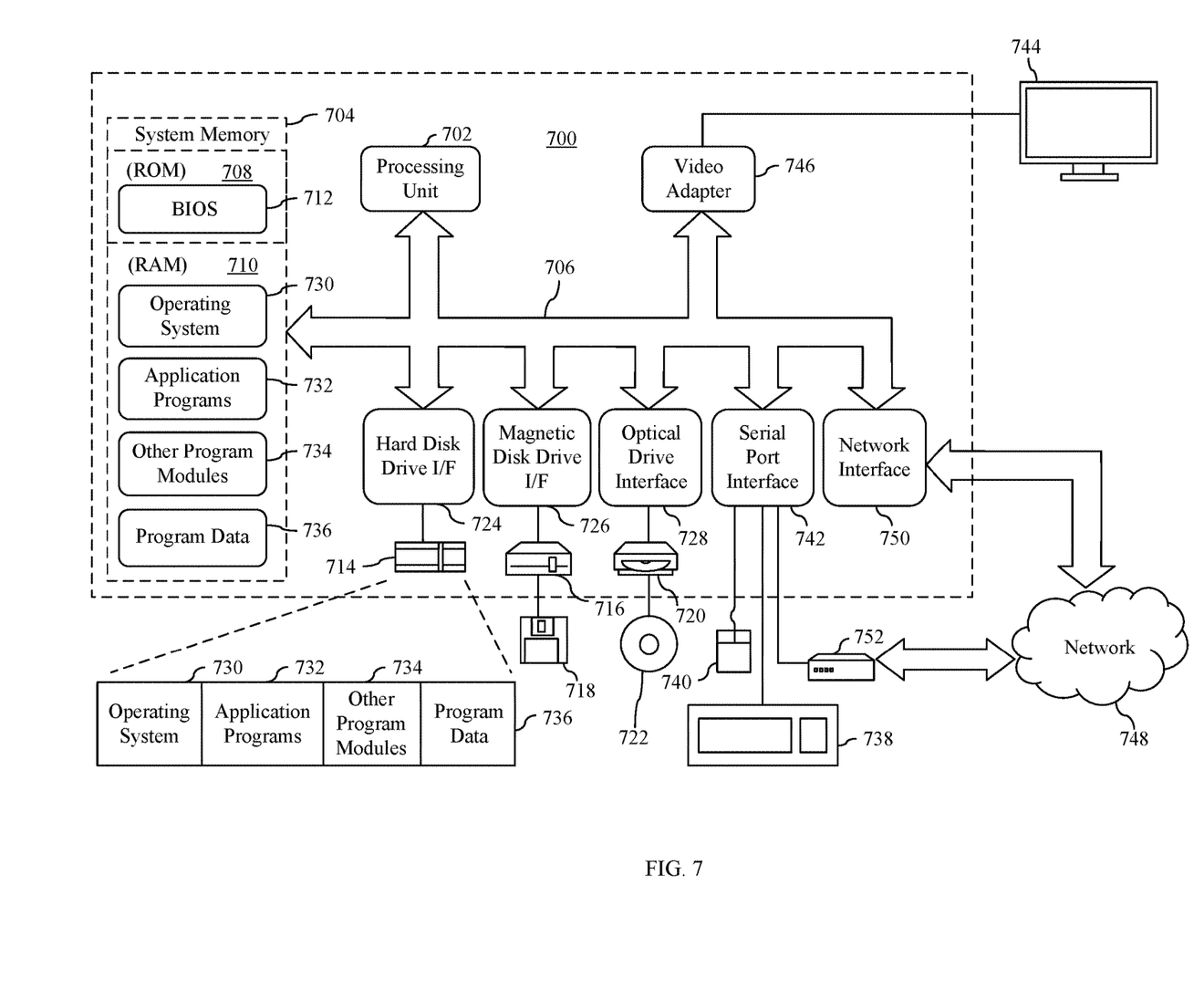
FIG. 7 is a block diagram of an example computing device that may be used to implement embodiments.

FIG. 7 depicts an example processor-based computer system 700 that may be used to implement various embodiments described herein, such as any of the embodiments described in the Sections above and in reference to FIGS. 1-6. For example, processor-based computer system 700 may be used to implement any of the components of systems 100 and 200 as described above in reference to FIGS. 1 and 2 as well as any of the flowcharts described above in reference to FIGS. 3-5. The description of system 700 provided herein is provided for purposes of illustration and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described in reference to FIGS. 1-6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 806 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

In an embodiment a system includes: a proxy server interconnected between a client computer and an application server, the client computer executing a front-end component of an application and the application server executing a back-end component of the application, the proxy server being configured to: cause a custom code component to be injected into the front-end component of the application; intercept a request sent from the front-end component of the application and intended for the back-end component of the application; and generate a response to the request that includes a command to create a cookie at the client computer, the cookie including data to be utilized by the custom code component.

In an embodiment of the foregoing system, the front-end component of the application comprises a web page displayed by a web browser executing on the client computer.

In an embodiment of the foregoing system, the proxy server is configured to cause the custom code component to be injected into the front-end component of the application by: appending code to the web page.

In an embodiment of the foregoing system, the proxy server is configured to append the code to the web page in response to determining that a main web page of the application is being loaded.

In an embodiment of the foregoing system, the request comprises a Hypertext Transfer Protocol (HTTP) request and the response comprises an HTTP response.

In an embodiment of the foregoing system, the proxy server is configured to generate the response by: creating a response; or modifying a response received from the application back-end component.

In an embodiment of the foregoing system, the proxy server is further configured to determine that the request comprises an action that should be blocked and to generate the response based on the determination.

In an embodiment of the foregoing system, the data to be utilized by the custom code component comprises a message to be displayed by the custom code component that concerns the action that should be blocked.

In an embodiment of the foregoing system, the data to be utilized by the custom code component comprises one or more of: information to be displayed by the custom code component; actions to be performed by the custom code component; or instructions to be executed by the custom code component.

In another embodiment, a system, comprises: a client computer interconnected to an application server via a proxy server, the client computer executing a front-end component of an application and the application server executing a back-end component of the application, the client computer being configured to: receive a custom code component from the proxy server; and inject the custom code component into the front-end component of the application; the front-end component of the application being configured to: generate a request intended for the back-end component of the application; send the request to the proxy server; receive a response to the request from the proxy server, the response including a command to create a cookie that was created by the proxy server; and create the cookie on the client computer based on the command; and the custom code component being configured to utilize data that is included in the cookie.

In an embodiment of the foregoing system, the custom code component is further configured to periodically determine if a new cookie has been received.

In an embodiment of the foregoing system, the front-end component of the application comprises a web page displayed by a web browser executing on the client computer.

In an embodiment of the foregoing system, the custom code component comprises code that is appended to the web page.

In an embodiment of the foregoing system, the request comprises a Hypertext Transfer Protocol (HTTP) request and the response comprises an HTTP response.

In an embodiment of the foregoing system, the custom code component is configured to utilize the data that is included in the cookie by performing one or more of: displaying information included in the cookie; performing actions specified in the cookie; or executing instructions included in the cookie In another embodiment, a method is performed by a computing device that is interconnected between a client computer that is executing a front-end component of an application and an application server that is executing a back-end component of the application. The method comprises: causing a custom code component to be injected into the front-end component of an application; intercepting a request sent from the front-end component of the application and intended for the back-end component of the application; and generating a response to the request that includes a command to create a cookie at the client computer, the cookie including data to be utilized by the custom code component.

In an embodiment of the foregoing method, the request comprises a Hypertext Transfer Protocol (HTTP) request and the response comprises an HTTP response.

In an embodiment of the foregoing method, said generating the response to the request further comprises: creating a response; or modifying a response received from the application back-end component.

In an embodiment of the foregoing method, the method further comprises determining that the request comprises an action that should be blocked and generating the response based on the determination.

In an embodiment of the foregoing method, the data to be consumed by the custom code component comprises a message to be displayed by the custom code component that concerns the action that should be blocked.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A proxy server, comprising:
   a processor; and
   a memory device that stores program code structured to cause the processor to:
      cause a custom code component to be injected into an application front-end component at a client computer;
      intercept a request from the application front-end component directed to an application back-end component at an application server; and
      generate a request response that comprises:
         a client cookie create command, and
         cookie data comprising at least one of:
            information to be displayed by the custom code component;
            actions to be performed by the custom code component; or
            instructions to be executed by the custom code component.

2. The proxy server of claim 1, wherein the request response is generated in response to the intercepted request and is directed to the client computer; and
   the client cookie create command is structured to cause the client computer to:
      create a cookie, and
      include the cookie data in the cookie.

3. The proxy server of claim 1, wherein the application front-end component comprises a web page displayable by a web browser of the client computer.

4. The proxy server of claim 3, wherein the custom code component is caused to be injected into the application front-end component by the custom code component being caused to be appended to the web page.

5. The proxy server of claim 4, wherein the custom code component is caused to be appended to the web page in response to a determination a main web page of the application is being loaded.

6. The proxy server of claim 1, wherein the request comprises a Hypertext Transfer Protocol (HTTP) request and the request response comprises an HTTP response.

7. The proxy server of claim 1, wherein the program code is structured to cause the processor to generate the request response by modification of a response received from the application back-end component.

8. The proxy server of claim 1, wherein the program code is further structured to cause the processor to:
   determine that the request comprises an action that should be blocked, and
   generate the request response based on the determination.

9. The proxy server of claim 8, wherein the cookie data comprises a message displayable by the custom code component that concerns the action that should be blocked.

10. The proxy server of claim 1, wherein the custom code component is further configured to periodically determine if a new cookie has been received.

11. A client computer, comprising:
   a processor; and
   a memory device that stores program code structured to cause the processor to:
      inject a custom code component received from a proxy server into an application front-end component;
   the application front-end component structured to cause the processor to:
      generate a request to an application back-end component at an application server;
      send the request to the proxy server;
      receive a request response that comprises:
         a client cookie create command, and
         cookie data utilizable by the custom code component that comprises at least one of:
            information to be displayed by the custom code component; or
            actions to be performed by the custom code component.

12. The client computer of claim 11, wherein the custom code component is structured to periodically determine if a new cookie has been received.

13. The client computer of claim 11, wherein the application front-end component comprises a web page displayable by a web browser of the client computer.

14. The client computer of claim 13, wherein the custom code component comprises code appended to the web page.

15. The client computer of claim 11, wherein the request comprises a Hypertext Transfer Protocol (HTTP) request and the request response comprises an HTTP response.

16. The client computer of claim 11, wherein the custom code component, to utilize the cookie data, is structured to perform at least one of:
   display the information;
   perform the actions; or
   execute the instructions.

17. A method performed by a proxy server, comprising:
   causing a custom code component to be injected into an application front-end component at a client computer;
   intercepting a request from the application front-end component directed to an application back-end component at an application server; and
   generating a request response that comprises:
      a client cookie create command, and
      cookie data comprising at least one of:
         information to be displayed by the custom code component;
         actions to be performed by the custom code component; or
         instructions to be executed by the custom code component.

18. The method of claim 17, wherein the request comprises a Hypertext Transfer Protocol (HTTP) request and the request response comprises an HTTP response.

19. The method of claim 17, wherein said generating the request response further comprises:
   modifying a response received from the application back-end component.

20. The method of claim 17, further comprising:
   determining that the request comprises an action that should be blocked; and
   generating the request response based on said determining.

* * * * *